US010930097B2

(12) United States Patent
Brown (10) Patent No.: US 10,930,097 B2
(45) Date of Patent: Feb. 23, 2021

(54) LOCKSET WITH INTEGRATED WIRELESS SIGNALS ANALYSIS FEATURE AND METHOD

(71) Applicant: Spectrum Brands, Inc., Middleton, WI (US)

(72) Inventor: Troy M. Brown, Aliso Viejo, CA (US)

(73) Assignee: Spectrum Brands, Inc., Middleton, WI (US)

( * ) Notice: Subject to any disclaimer, the term of this patent is extended or adjusted under 35 U.S.C. 154(b) by 0 days.

(21) Appl. No.: 16/094,825

(22) PCT Filed: Apr. 17, 2017

(86) PCT No.: PCT/US2017/027938
§ 371 (c)(1),
(2) Date: Oct. 18, 2018

(87) PCT Pub. No.: WO2017/184513
PCT Pub. Date: Oct. 26, 2017

(65) Prior Publication Data
US 2019/0122465 A1    Apr. 25, 2019

Related U.S. Application Data

(60) Provisional application No. 62/324,484, filed on Apr. 19, 2016.

(51) Int. Cl.
*G05B 19/00* (2006.01)
*H04W 68/00* (2009.01)
(Continued)

(52) U.S. Cl.
CPC ...... *G07C 9/00309* (2013.01); *E05B 47/0001* (2013.01); *G06K 17/0022* (2013.01);
(Continued)

(58) Field of Classification Search
CPC .. G07C 2209/63; G07C 9/00; G07C 9/00309; G07C 2009/00769; G07C 9/00571; G07C 2009/00507; G07C 2009/00603; G07C 2009/00809; G07C 2209/62; G07C 9/00174; G07C 9/00182; G07C 9/00896; G07C 9/00904; G07C 9/27; G07C 9/28;
(Continued)

(56) References Cited

U.S. PATENT DOCUMENTS 9,024,759 B2   5/2015  Uyeda et al.
9,210,534 B1 * 12/2015  Matthieu ................. H04L 67/16
(Continued)

FOREIGN PATENT DOCUMENTS

KR   10-2012-0074569 A   7/2012

OTHER PUBLICATIONS

International Search Report and Written Opinion for PCT/US2017/027938 (dated Aug. 30, 2017).

*Primary Examiner* — Dionne Pendleton
(74) *Attorney, Agent, or Firm* — Merchant & Gould P.C.

(57) ABSTRACT

A wireless lockset with integrated wireless signals analysis and method is described herein. The analysis integrated into the wireless lockset allows remote monitoring of a building or dwelling. A user can track and be notified of the state of occupancy of a dwelling based upon when specific un-associated devices that are within range of the lockset.

20 Claims, 7 Drawing Sheets

(51) Int. Cl.
*G07C 9/00* (2020.01)
*H04M 1/725* (2021.01)
*G06K 17/00* (2006.01)
*E05B 47/00* (2006.01)
*G08B 13/00* (2006.01)
*H04W 4/80* (2018.01)

(52) U.S. Cl.
CPC ........... *G06K 17/0029* (2013.01); *G07C 9/00* (2013.01); *G07C 9/00174* (2013.01); *G07C 9/00896* (2013.01); *H04M 1/7253* (2013.01); *G07C 2209/06* (2013.01); *G07C 2209/63* (2013.01); *G08B 13/00* (2013.01); *H04M 1/72563* (2013.01); *H04W 4/80* (2018.02)

(58) Field of Classification Search
CPC ........... G07C 9/38; G07C 2009/00793; G07C 9/00817; G07C 9/00944; G07C 2009/00825; G07C 2209/04; G07C 9/20; G07C 9/37; G07C 2209/06; G08B 13/00; G08B 13/2462; G08B 13/06; G08B 13/096; G08B 25/008; G08B 25/009; G08B 13/19682; G08B 13/19684; G08B 13/19695; G08B 19/00; G08B 21/02; G08B 21/0236; G08B 21/0266; G08B 21/0269; G08B 21/0272; G08B 21/0275; G08B 21/0277; G08B 21/22; G08B 25/014; G08B 25/12; G08B 25/14; G08B 27/001; H04M 1/7253; H04M 1/72563; H04M 11/04; H04W 4/80; H04W 12/06; H04W 4/023; H04W 84/12; H04W 8/005; H04W 12/003; H04W 12/00503; H04W 12/04; H04W 12/08; H04W 84/18; H04W 4/00; H04W 4/02; H04W 4/029; H04W 64/00; H04W 4/08; H04W 12/0605; H04W 12/0609; H04W 12/0804; H04W 12/0806; H04W 48/18; H04W 48/20; H04W 4/38; H04W 4/44; H04W 4/60; H04W 4/70; H04W 4/90; H04W 76/11; H04W 76/14; H04W 76/15; H04W 88/16; H04W 92/18; G05B 15/02; H04L 12/2803; H04L 12/2807; H04L 12/6418; H04L 2012/285; H04L 41/0806; H04L 43/10; H04L 63/083; H04L 67/10; H04L 12/2809; H04L 12/2818; H04L 12/2825; H04L 12/2834; H04L 12/2836; H04L 2012/2841; H04L 63/102; H04L 67/06; H04L 12/12; H04L 12/185; H04L 12/1895; H04L 12/2829; H04L 29/06802; H04L 41/0654; H04L 41/0813; H04L 41/0866; H04L 41/0886; H04L 41/0893; H04L 43/065; H04L 63/0853; H04L 63/0876; H04L 63/168; H04L 67/12; H04L 67/141; H04L 67/22; H04L 67/303; H05B 45/20; H05B 47/19; E05C 1/02; H04B 5/0006; H04B 5/0031; H04B 13/005; Y04S 40/20; Y10T 292/1014; Y10T 70/5155; Y10T 70/70; G06K 7/045; G06K 17/0022; G06K 17/0029; G06K 7/10009; A61B 5/076; G06F 16/176; G06F 21/6218; G06Q 20/047; G06Q 20/18; G06Q 20/20; G06Q 20/3278; G07F 7/08; E05B 2047/0054; E05B 47/0001; E05B 17/10; E05B 17/22; E05B 2045/0615; E05B 2045/0695; E05B 2047/0053; E05B 2047/0067; E05B 45/06; E05B 47/00; E05B 47/026; E05B 47/06

See application file for complete search history.

(56) References Cited

U.S. PATENT DOCUMENTS

| | | | | |
|---|---|---|---|---|
| 9,396,599 | B1* | 7/2016 | Malhotra | G07C 9/00174 |
| 9,854,445 | B1* | 12/2017 | Gu | H04L 67/18 |
| 10,075,334 | B1* | 9/2018 | Kozura | H04L 41/0806 |
| 2010/0283579 | A1* | 11/2010 | Kraus | G07C 9/00944 340/5.7 |
| 2012/0213362 | A1 | 8/2012 | Bliding et al. | |
| 2012/0234058 | A1 | 9/2012 | Neil et al. | |
| 2013/0063265 | A1 | 3/2013 | Feldstein et al. | |
| 2014/0051355 | A1 | 2/2014 | Ahearn et al. | |
| 2015/0120000 | A1* | 4/2015 | Coffey | H04L 12/2803 700/13 |
| 2016/0189510 | A1* | 6/2016 | Hutz | G08B 21/0277 340/541 |
| 2017/0034215 | A1* | 2/2017 | Sigel | H04W 48/16 |
| 2017/0171802 | A1* | 6/2017 | Hou | H04W 12/08 |
| 2017/0289750 | A1* | 10/2017 | Haapanen | H04W 4/029 |

* cited by examiner

LOCKSET WITH INTEGRATED WIRELESS SIGNALS ANALYSIS FEATURE AND METHOD

RELATED APPLICATIONS

This application is a National Stage Application of PCT/US2017/027938, filed Apr. 17, 2017, which claims the benefit of U.S. Provisional Application No. 62/324,484, filed Apr. 19, 2016, which applications are incorporated herein by reference. To the extent appropriate, a claim of priority is made to each of the above disclosed applications.

TECHNICAL FIELD

The present disclosure relates generally to locking devices; in particular, this disclosure relates to an electronic locking device for wirelessly detecting known and unknown devices.

BACKGROUND

Electronic locking systems are in widespread use in residential and commercial markets. In some cases, electronic locks control mechanical locking assemblies, such as movement of a deadbolt between its extended and retracted positions. These locking systems control ingress through doors in a building by requiring certain credentials. These credentials may include keyed or keyless entry types. Some keyless entry types include a keypad in which a user may gain access by entering a code. In some cases, for example, the credentials and/or commands may be provided wirelessly to a lockset, such as disclosed in U.S. Pat. No. 9,024,759 for a "Wireless Lockset With Integrated Antenna, Touch Activation, and Light Communication Method," filed Mar. 10, 2014 and U.S. Pre-Grant Publication No. 2012/0234058 for a "Wireless Access Control System and Related Methods," filed Mar. 8, 2012, both of which are hereby incorporated by reference.

Many existing electronic locks include a notification feature. The notification feature typically allows a user with administrator privileges to be notified, such as with a text message, email, etc., when other users operate the lock. For example, when a user unlocks the electronic lock, the administrator user may receive a text message or email that someone operated the lock, and in some cases, which user has operated the lock.

Although this type of notification feature allows limited remote monitoring, there are several challenges. One challenge is that the remote monitoring is limited to the door on which the electronic lock is installed. Typically, there may be many entrances to a building and no notification will be generated if a user enters/exits through an entrance not having the electronic lock installed. Another challenge is that existing electronic locks require pairing of devices (e.g., key fob, smartphone app, etc.) with the electronic lock to determine which user is operating the lock.

SUMMARY

According to the present disclosure, a door lock system is provided that periodically scans and analyzes devices within a certain range of the door lock hardware system. In one exemplary embodiment, the door lock hardware system may include a radio that periodically scans and analyzes all known and unknown devices within a specific range of the door lock hardware system. All devices, known or unknown, may be assigned an identification code that is presented to a user via a graphical user interface. The user may adjust settings to pick and choose which devices to have tracked by the door lock hardware system using the graphical user interface. In a further embodiment, the user may adjust settings to pick and choose which devices trigger notifications by the door lock system to the user or another user. Other actions may be triggered in response to the detection of devices, known or unknown, within range of the door lock hardware.

BRIEF DESCRIPTION OF THE FIGURES

The detailed description makes references to the accompanying figures in which.

DETAILED DESCRIPTION

The figures and descriptions provided herein may have been simplified to illustrate aspects that are relevant for a clear understanding of the herein described devices, systems, and methods, while eliminating, for the purpose of clarity, other aspects that may be found in typical devices, systems, and methods. Those of ordinary skill may recognize that other elements and/or operations may be desirable and/or necessary to implement the devices, systems, and methods described herein. Because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Figure 1:
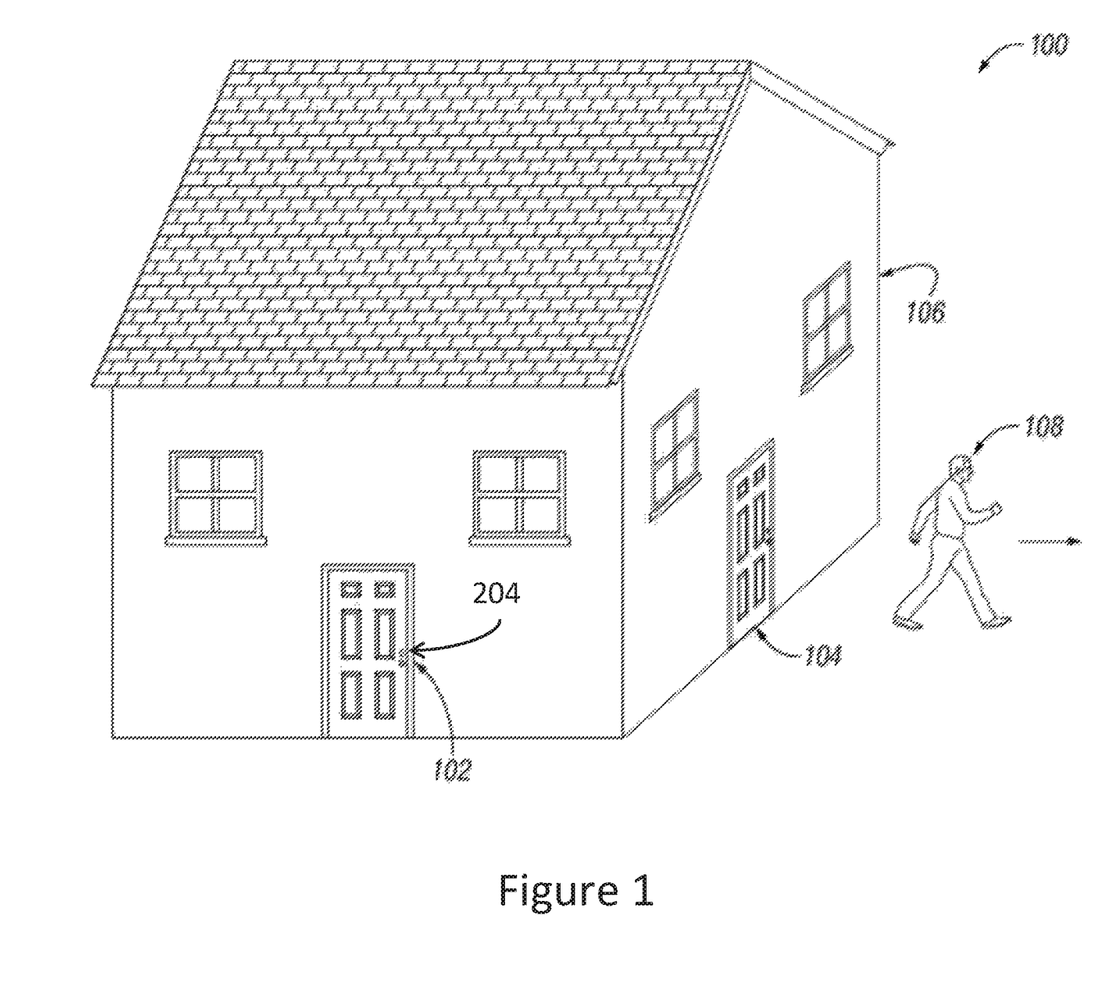
FIG. 1 is an exemplary environment in which a lock assembly may operate according to one embodiment of this disclosure.

Referring now to the drawings and particularly to FIG. 1, there is shown an exemplary environment in which a lock assembly 204 may operate according to an embodiment of this disclosure. A typical environment 100 may include a single dwelling 106. In other embodiments, the environment may include multiple dwellings in close proximity with one another, such as an apartment complex, one or more townhomes, or a commercial building. Typically, the dwelling may include more than one entryway. For example, the dwelling 106 may include a front door 102, a side door 104, another door in the rear of the dwelling (not shown), a door coming in from a garage (not shown), and/or other doors providing ingress/egress to the dwelling 106. One advantage of the lock assembly 204 is that it only needs to be installed on one of the doors while monitoring other doors that provide ingress/egress to the dwelling 106. Consider an example in which the lock assembly 204 is installed on the front door 102. Even though a user 108 is shown leaving the dwelling 106 using the side door 104, which is a door that does not have the lock assembly 204 installed, the user 108 may still be detected by the locking assembly 204 on the front door 102 as leaving the dwelling 106 from the side door 104. As described below, the lock assembly 204 can detect the user by wirelessly scanning for devices in proximity such as a user carrying a wireless device (e.g., a smart phone, key fob, etc.), which is detected by the lock assembly 204 installed on the front door 102 using, for example, an integrated radio. The lock assembly 204 is shown installed on the front door 102 for purposes of example, but could be installed on any door in the dwelling 106.

Figure 2:
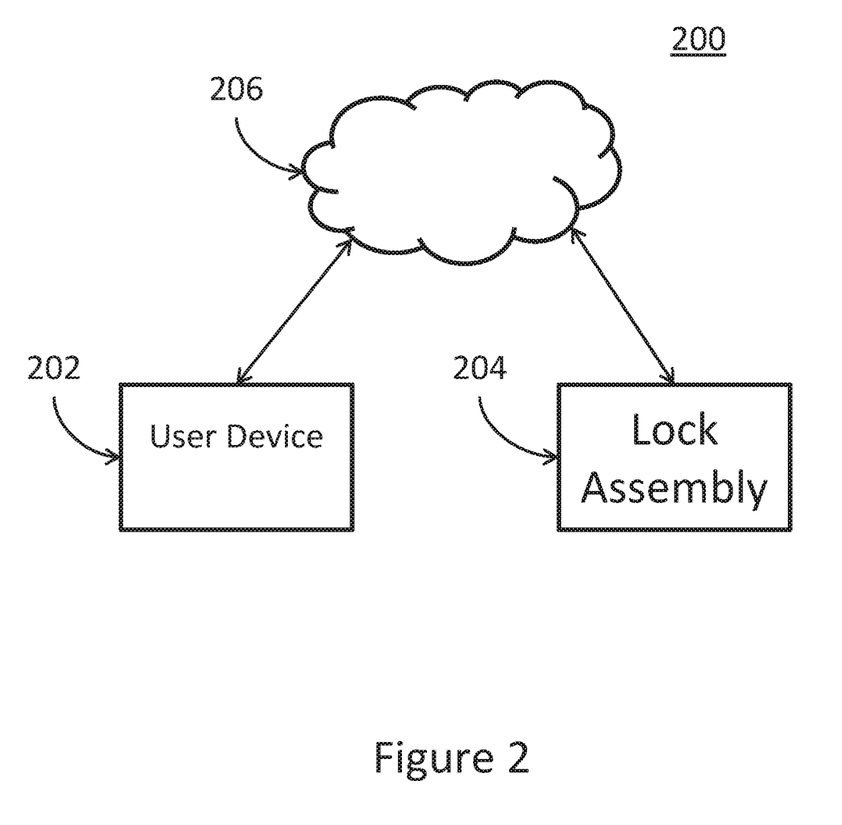
FIG. 2 is a simplified block diagram of an example system for determining proximate devices within range of the lock assembly according to an embodiment of this disclosure.

Referring now to FIG. 2, there is shown an example system configuration 200 for synchronizing information. In the example shown, the system includes a user device 202 that may receive proximate device list information determined by and from the lock assembly 204, via a network 206. The network 206 may be any type of network known to one of ordinary skill, such as a local area network or the Internet. The lock assembly 204 may include a wireless communication module (see FIG. 7) that facilitates wireless communications with the user device 202 through a desired wireless communications protocol. In an another embodiment, the user device 202 may synchronize directly with the lock assembly 204 using an any desired protocol, such as Bluetooth™, Zigbee™, or Z-wave™.

Figure 3:
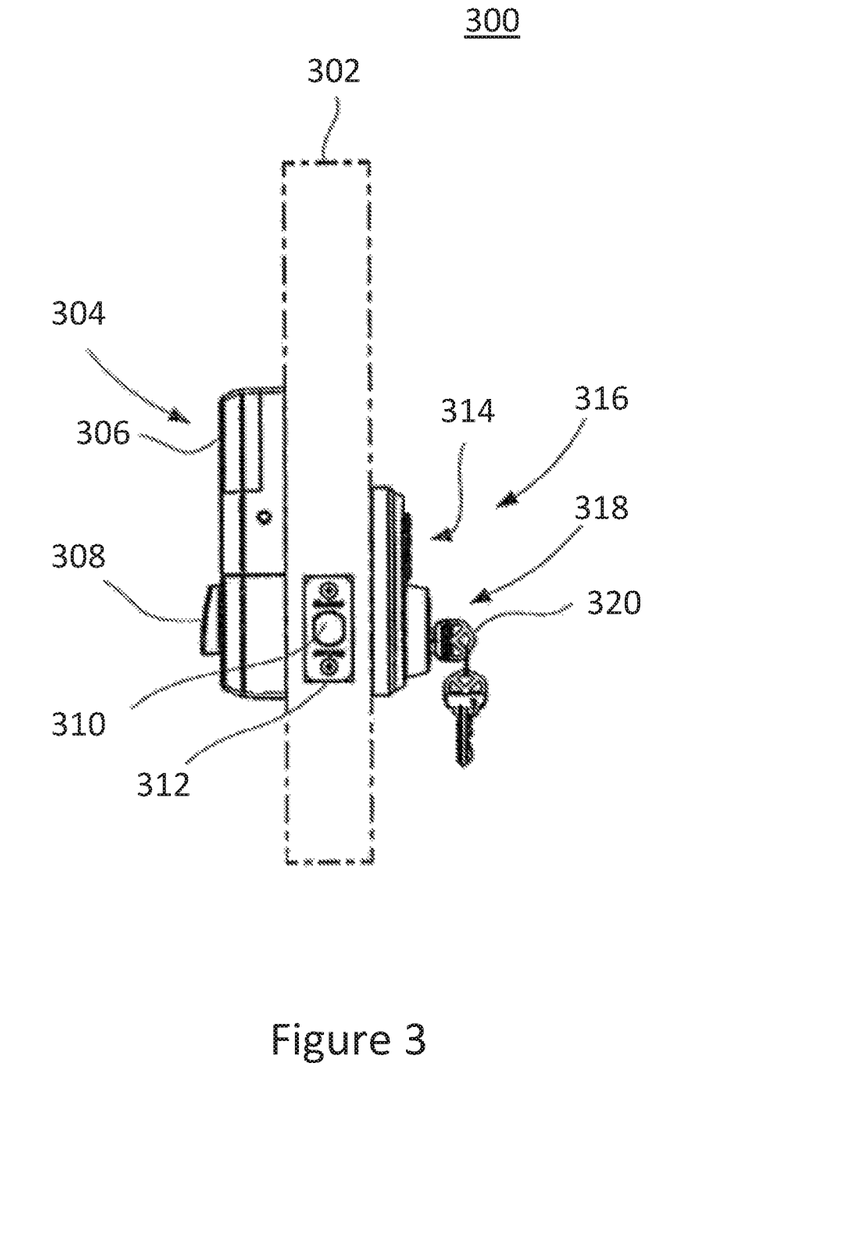
FIG. 3 is a side view of an electronic lock assembly and corresponding hardware in accordance with an embodiment of the present disclosure, installed on a door and with the door shown in phantom lines.

Referring now to FIG. 3, there is shown an example electronic lock 300 in accordance with an embodiment of the present disclosure for mounting on a door 302, which includes an interior chassis 304, a removable cover 306, a manual turnpiece 308, a bolt 310, a face plate 312, a user input 314, an exterior chassis 316, a mechanical lock assembly 318, and a removable key 320. The interior chassis 304 may include the electronic circuitry for an integrated radio. The integrated radio may have the ability to scan one or more frequency bands for the detection of proximate devices, such as smart phones, PDAs, key fobs, or the like. The integrated radio may typically use Bluetooth or Wi-Fi for the scanning of proximate devices. Additional devices, such as LEDs, switches, other integrated circuits, antenna, and others are designed into the electronic circuitry. The electronic lock 300 may be installed on the exterior portion of the door, the interior, or a combination of exterior/interior installation.

Figure 4:
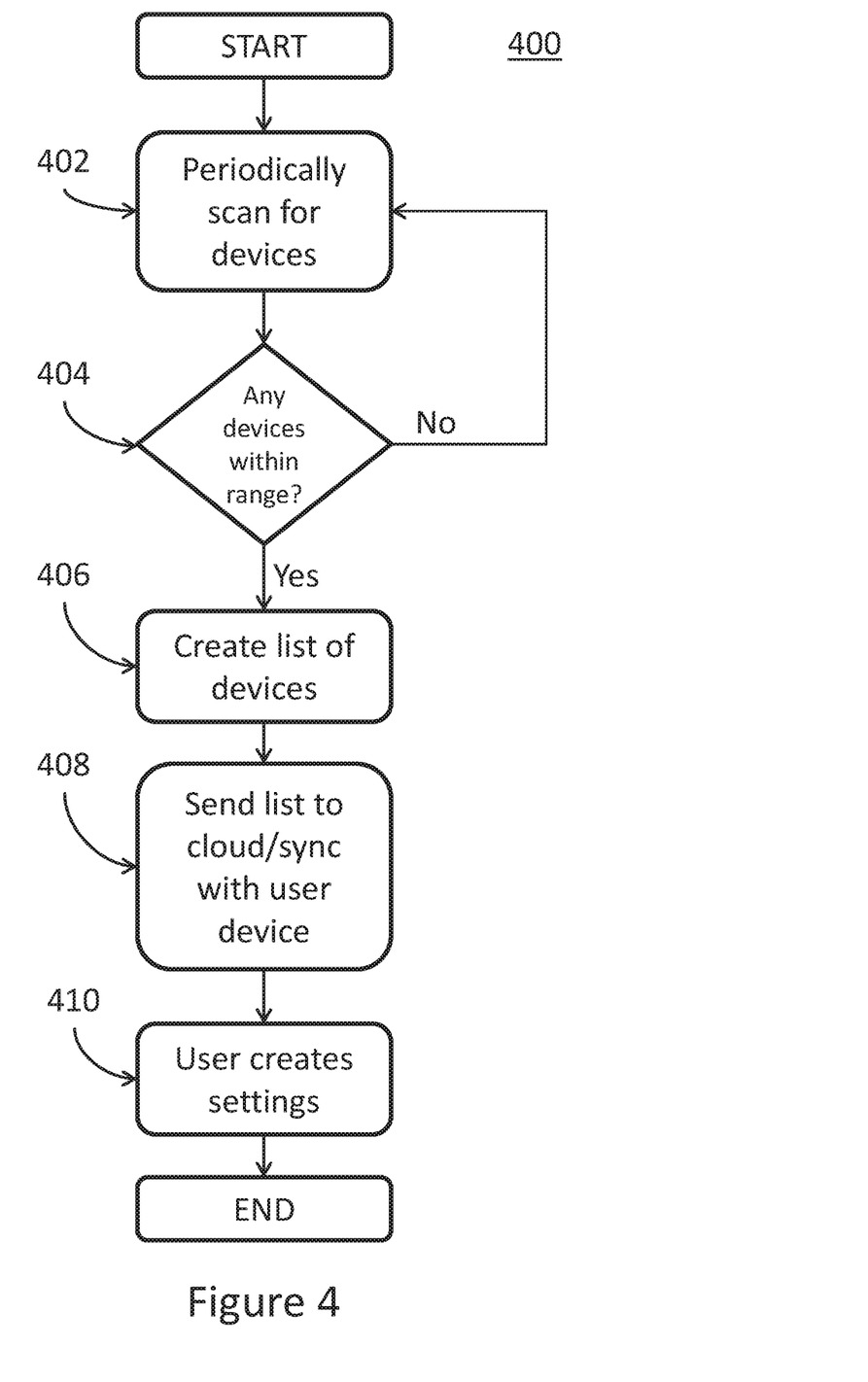
FIG. 4 is a flow diagram of an example method for determining a list of devices within a proximate range of the lock hardware according to an embodiment of this disclosure.

FIG. 4 is a simplified flow chart showing an example of the integrated radio of the door hardware performing a scan for proximate devices and compiling a list of detected devices. In this example, the method 400 begins with step 402 by periodically scanning for devices. The integrated radio may scan a frequency band, or bands, of interest and record the unique signatures of any other wireless device in that same frequency band. In step 404, if no devices are detected, the process restarts at step 402. If any devices are detected, the process moves to step 406. In step 406, a list of devices is created. For each device, the integrated radio may assign a unique identification code. Each device may also be categorized with certain characteristics. These characteristics may include, but are not limited to, ID, name, range, time of detection, dwell time, device type, and operating system. In some embodiments, the system attempts to identify as many characteristics as possible of the detected devices, especially in instances where a device is an unknown device. The characteristics may be saved, along with the device list, within a memory of the lock assembly 204. The device list may be saved within the memory of the lock assembly 204 for a certain period of time, such as 24 hours, a week, a month, or the like, to provide a history of detected proximate devices. The history may also be saved to a cloud server for access by the user device 202 at a later time. After the list is determined, the process moves to step 408 and the list may be sent to a cloud server for synchronization of a user device, such as a user's smartphone. In another embodiment, the list may be synchronized with a user's device when the user's device comes within a certain proximity of the lock assembly 204, such as using a near field communications protocol (e.g., Bluetooth™, etc.). In step 410, the user may decide, after viewing the list of devices to create notifications, which is described in further detail below in conjunction with FIG. 6.

Figure 5:
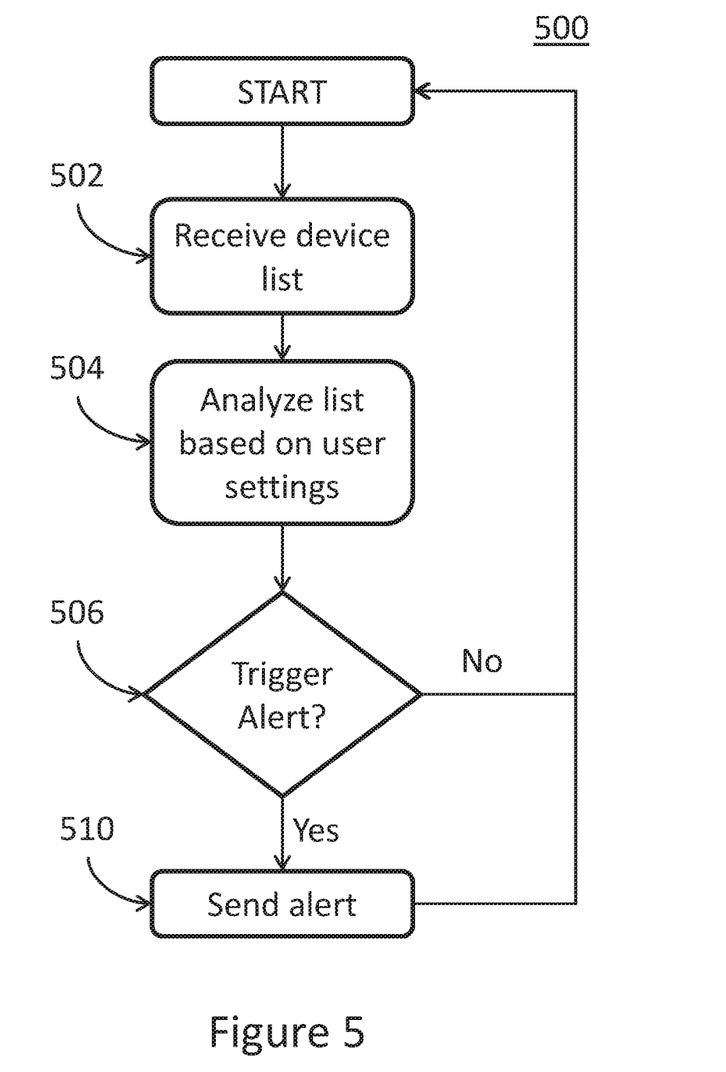
FIG. 5 is a flow diagram of an example method for the triggering alert notifications based on predefined user settings according to an embodiment of this disclosure.

FIG. 5 is a simplified flowchart showing an example of alert notifications being triggered based on the detection of certain devices. In this example, the method 500 starts with step 502, the reception of the device list, which could be, for example, the list created in FIG. 4, step 408. The reception may be made either at a remote server, or locally within the hardware of the lock assembly 204 itself. In step 504, the device list is analyzed based on user settings created by a user, which is described in further detail below in conjunction with FIG. 6. In step 506, the lock assembly 204 determines, for each device in the list, whether an alert should be triggered. If no alerts are to be triggered, the process goes back to step 502. If alerts are to be triggered, the process moves to step 510 and the appropriate alert, or notification, is sent. For example, a user may want to be notified when their child's cell phone is within range of the lock assembly 204. A user, therefore, creates a setting to be notified when the child's device is on the list of devices and may receive an appropriate notification (e.g., SMS, text, email, etc.). In another exemplary embodiment, a user may choose to be notified every time an unknown, or new, device is determined to be within range of the lock hardware. Once an unknown, or new, device is determined to be on the list, the user may be notified accordingly (e.g., SMS, text, email, etc.). Even further, the lock assembly 204 may be in communication with a home automation system. So while the user may be notified of the unknown device, a command may also be triggered to the home automation system to lock all doors/windows or even close an open garage door.

Figure 6:
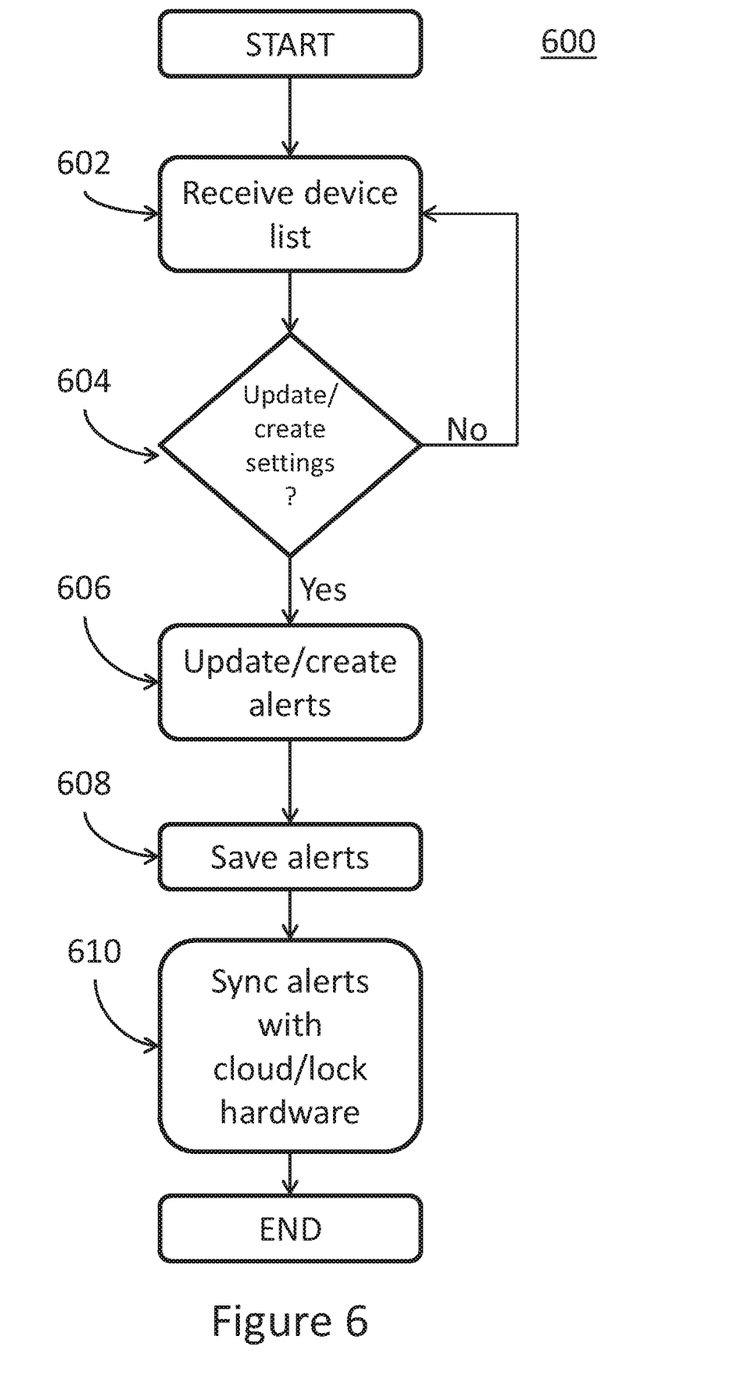
FIG. 6 is a flow diagram of an example method for a user receiving a list of devices and creating user settings for alert notifications according to an embodiment of this disclosure.

FIG. 6 is a simplified flowchart showing an example from a user's point of view utilizing a user device having a software application that interacts, either directly or indirectly, with the lock assembly 204. In this example, the process 600 starts with step 602 and receiving a device list which may be viewed on a screen of the user's device via a software application, or "app." The device list essentially represents the state of occupancy of a certain dwelling, such as all of the devices within a certain range of the dwelling 106 of FIG. 1. In step 604, the user may decide to update or create settings to establish notifications and/or alerts to occur when devices are detected within a certain proximity of the lock assembly 204. If the user elects not to make any changes, the process moves back to step 602. If the user elects to make changes, the process moves to step 606 to update/create alerts. As mentioned above, the user may elect to receive certain notifications (e.g., SMS, text, email) when certain devices are determined to be within range of the lock hardware. Other settings may be established as well; for example, the proximity range to being a certain area, based on the size of the dwelling, or command settings to be sent to a home automation system based on certain detected devices. Once settings are complete, the process moves to step 608 and the elected alerts/notifications are saved. In step 610, the saved alerts/notifications may be synchronized with a cloud server and/or the lock assembly 204.

Figure 7:
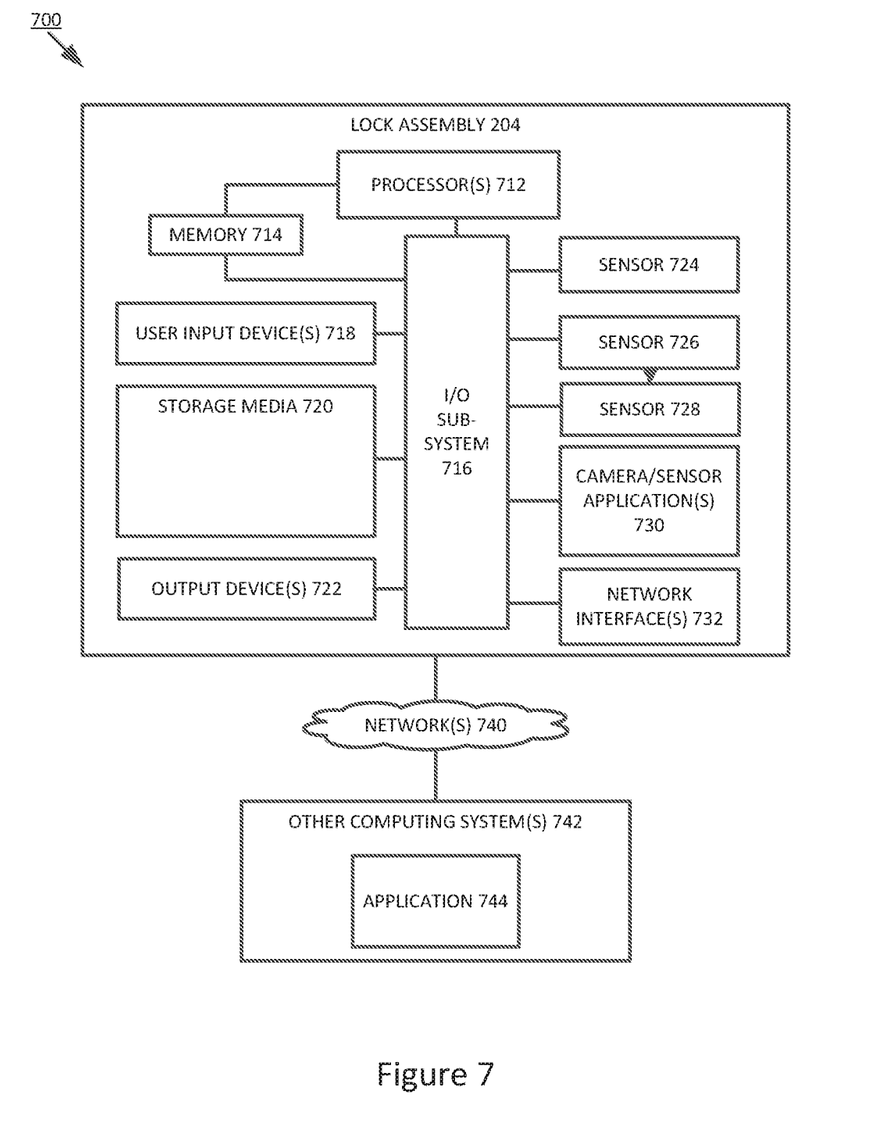
FIG. 7 is a simplified block diagram of an exemplary computing environment in connection with at least one embodiment of the lock assembly of FIG. 1.

Referring now to FIG. 7, a simplified block diagram of an exemplary computing environment or system 700 for the lock assembly 204, in which the door lockset application, is shown. The illustrative implementation 700 includes a lock assembly 204, which may be in communication with one or more other computing systems or devices 742 via one or more networks 740. As shown, the lock assembly 204 comprises storage media 720.

The illustrative lock assembly 204 includes at least one processor 712 (e.g., a microprocessor, microcontroller, digital signal processor, etc.), memory 714, and an input/output (I/O) subsystem 716. Although not specifically shown, it should be understood that the I/O subsystem 716 may include, among other things, an I/O controller, a memory controller, and one or more I/O ports. The processor 712 and the I/O subsystem 716 are communicatively coupled to the memory 714. The memory 714 may be embodied as any type of suitable computer memory device (e.g., volatile memory such as various forms of random access memory).

The I/O subsystem 716 is communicatively coupled to a number of components including one or more user input devices 718 (e.g., a touchscreen, keyboard, virtual keypad, microphone, etc.), one or more storage media 720, one or more output devices 722 (e.g., speakers, LEDs, etc.), one or more sensing devices 724, 726, 728, one or more camera or other sensor applications 730 (e.g., software-based sensor controls), and one or more network interfaces 732.

The storage media 720 may include one or more hard drives or other suitable data storage devices (e.g., flash memory, memory cards, memory sticks, and/or others). In some embodiments, portions of systems software (e.g., an operating system, etc.) or framework/middleware (e.g., APIs, object libraries, etc.) may be copied to the memory 714 during operation of a computing device 710, for faster processing or other reasons.

The one or more network interfaces 732 may communicatively couple the computing device 710 to a network, such as a local area network, wide area network, personal cloud, enterprise cloud, public cloud, and/or the Internet, for example. Accordingly, the network interfaces 732 may include one or more wired or wireless network interface cards or adapters, for example, as may be needed pursuant to the specifications and/or design of the particular computing system 700. The network interface(s) 732 may provide short-range wireless or optical communication capabilities using, e.g., Near Field Communication (NFC), wireless fidelity (Wi-Fi), radio frequency identification (RFID), infrared (IR), or other suitable technology. Further, the wireless communications may use the Zigbee or Z-Wave protocols.

The other computing system(s) 742 may be embodied as any suitable type of computing system or device such as any of the aforementioned types of devices or other electronic devices or systems. For example, in some embodiments, the other computing systems 742 may include one or more server computers used to store portions of the data stored in storage media 720. Further, computing device 742 may further include application 744 to provide an interface for display to a user to implement the embodiments of the disclosure set forth. The computing system 700 may include other components, subcomponents, and devices not illustrated in FIG. 7 for clarity of the description. In general, the components of the computing system 700 are communicatively coupled as shown in FIG. 7 by electronic signal paths, which may be embodied as any type of wired or wireless signal paths capable of facilitating communication between the respective devices and components.

Examples

Illustrative examples of the wireless lockset with integrated wireless signals disclosed herein are provided below. An embodiment of the wireless lockset may include any one or more, and any combination of, the examples described below.

Example 1 is a system including an electronic lock for use with a mobile device. The system includes a locking device movable between a locked position and an unlocked position and an electronic lock with an integrated radio. The electronic lock is configured to scan a proximate area for known and unknown devices, wherein the proximate area is a predefined area within range of the electronic lock; determine a list of known and unknown devices within the proximate area; synchronize the list of known and unknown devices with the mobile device; and trigger one or more alerts based on the list of known and unknown devices.

In Example 2, the subject matter of Example 1 is further configured such that the proximate device list is synchronized with the mobile device via the Internet.

In Example 3, the subject matter of Example 1 is further configured such that the proximate device list is synchronized with the mobile device via Bluetooth.

In Example 4, the subject matter of Example 1 is further configured such that the mobile device is configured to receive the list of known and unknown devices; and create or update, by a user of the mobile device, user settings defining alerts or notifications associated with one or more of the known and unknown devices.

In Example 5, the subject matter of Example 4 is further configured such that each device is categorized with one or more characteristics, the one or more characteristics being an ID, name, range, time of detection, dwell time, device type, and operating system.

In Example 6, the subject matter of Example 5 is further configured such that the one or more alerts triggered are further based on the user settings.

In Example 7, the subject matter of Example 1 is further configured such that all determined proximate devices are stored in a master list for a period of time.

Example 8 is an electronic lock comprising at least one processor and a non-transitory computer-medium, the non-transitory computer-medium comprising a plurality of instructions that, in response to being executed by the at least one processor, perform scanning a proximate area for known and unknown devices, wherein the proximate area is a predefined area within range of the electronic lock; determining a list of known and unknown devices within the proximate area; synchronizing the list of known and unknown devices with a mobile device; and triggering one or more alerts based on the list of known and unknown devices.

In Example 9, the subject matter of Example 8 is further configured such that the proximate device list is synchronized with the mobile device via the Internet.

In Example 10, the subject matter of Example 8 is further configured such that the proximate device list is synchronized with the mobile device via Bluetooth.

In Example 11, the subject matter of Example 8 is further configured such that the instructions, when executed by the processor, further perform receiving the list of known and unknown devices; and creating or updating, by a user of the mobile device, defining alerts or notifications associated with one or more of the known and unknown devices.

In Example 12, the subject matter of Example 11 is further configured such that each device is categorized with one or more characteristics, the one or more characteristics being an ID, name, range, time of detection, dwell time, device type, and operating system.

In Example 13, the subject matter of Example 12 is further configured such that the one or more alerts triggered are further based on the user settings.

In Example 14, the subject matter of Example 8 is further configured such that all determined proximate devices are stored in a master list for a period of time.

Example 15 is a method for determining a list of devices proximate to an electronic lock. The method includes the steps of scanning a proximate area for devices, wherein the proximate area is a predefined area within range of the electronic lock; determining a list of known and unknown devices within the proximate area; synchronizing the list of known and unknown devices with a mobile device; and triggering one or more alerts based on the list of known and unknown devices.

In Example 16, the subject matter of Example 15 is further configured such that the proximate device list is synchronized with the mobile device via the Internet.

In Example 17, the subject matter of Example 15 is further configured such that the proximate device list is synchronized with the mobile device via Bluetooth.

In Example 18, the subject matter of Example 15 is further configured such that the method includes the steps of receiving the list of known and unknown devices; and creating or updating, by a user of the mobile device, defining alerts or notifications associated with one or more of the known and unknown devices.

In Example 19, the subject matter of Example 18 is further configured such that each device is categorized with one or more characteristics, the one or more characteristics being an ID, name, range, time of detection, dwell time, device type, and operating system.

In Example 20, the subject matter of Example 19 is further configured such that the one or more alerts triggered are further based on the user settings.

Although the present disclosure has been described with reference to particular means, materials and embodiments, from the foregoing description, one skilled in the art can easily ascertain the essential characteristics of the present disclosure and various changes and modifications may be made to adapt the various uses and characteristics without departing from the spirit and scope of the present invention as set forth in the following claims.

What is claimed is:

1. A system comprising an electronic lock for use with a mobile device, the system comprising:
    a locking device movable between a locked position and an unlocked position;
    the electronic lock comprising an integrated radio, the electronic lock configured to:
        scan a proximate area for known and unknown devices, wherein the proximate area is a predefined area within range of the electronic lock;
        determine a list of known and unknown devices within the proximate area;
        synchronize the list of known and unknown devices with the mobile device;
        determine, individually for each of the known devices, whether one or more alerts should be triggered, and determine as a group for all of the unknown devices, whether one or more alerts should be triggered; and
        if one or more alerts are triggered, send the one or more alerts to the mobile device.

2. The system of claim 1, wherein the proximate device list is synchronized with the mobile device via the Internet.

3. The system of claim 1, wherein the proximate device list is synchronized with the mobile device via Bluetooth.

4. The system of claim 1, wherein the mobile device is configured to:
    receive the list of known and unknown devices;
    create or update, by a user of the mobile device, user settings defining alerts or notifications associated with one or more of the known and unknown devices.

5. The system of claim 4, wherein each device is categorized with one or more characteristics, the one or more characteristics being an ID, name, range, time of detection, dwell time, device type, and operating system.

6. The system of claim 5, wherein the one or more alerts triggered are further based on the user settings.

7. The system of claim 1, wherein all determined proximate devices are stored in a master list for a period of time.

8. An electronic lock comprising at least one processor and a non-transitory computer-medium, the non-transitory computer-medium comprising a plurality of instructions that, in response to being executed by the at least one processor, perform:
    scanning a proximate area for known and unknown devices, wherein the proximate area is a predefined area within range of the electronic lock;
    determining a list of known and unknown devices within the proximate area;

synchronizing the list of known and unknown devices with a mobile device;

determining, individually for each of the known devices, whether one or more alerts should be triggered, and determine as a group for all of the unknown devices, whether one or more alerts should be triggered; and if one or more alerts are triggered, sending the one or more alerts to the mobile device.

9. The electronic lock of claim 8, wherein the proximate device list is synchronized with the mobile device via the Internet.

10. The electronic lock of claim 8, wherein the proximate device list is synchronized with the mobile device via Bluetooth.

11. The electronic lock of claim 8, wherein the instructions, when executed by the processor, further perform:

receiving the list of known and unknown devices;

creating or updating, by a user of the mobile device, defining alerts or notifications associated with one or more of the known and unknown devices.

12. The electronic lock of claim 11, wherein each device is categorized with one or more characteristics, the one or more characteristics being an ID, name, range, time of detection, dwell time, device type, and operating system.

13. The electronic lock of claim 12, wherein the one or more alerts triggered are further based on a user setting.

14. The electronic lock of claim 8, wherein all determined proximate devices are stored in a master list for a period of time.

15. A method for determining a list of devices proximate to an electronic lock, the method comprising:

scanning a proximate area for devices, wherein the proximate area is a predefined area within range of the electronic lock;

determining a list of known and unknown devices within the proximate area;

synchronizing the list of known and unknown devices with a mobile device;

determining, individually for each of the known devices, whether one or more alerts should be triggered, and determine as a group for all of the unknown devices, whether one or more alerts should be triggered; and if one or more alerts are triggered, sending the one or more alerts to the mobile device.

16. The method of claim 15, wherein the proximate device list is synchronized with the mobile device via the Internet.

17. The method of claim 15, wherein the proximate device list is synchronized with the mobile device via Bluetooth.

18. The method of claim 15, further comprising:

receiving the list of known and unknown devices;

creating or updating, by a user of the mobile device, defining alerts or notifications associated with one or more of the known and unknown devices.

19. The method of claim 18, wherein each device is categorized with one or more characteristics, the one or more characteristics being an ID, name, range, time of detection, dwell time, device type, and operating system.

20. The method of claim 19, wherein the one or more alerts triggered are further based on a user setting.

* * * * *